United States Patent [19]

Eggimann et al.

[11] 3,775,685

[45] Nov. 27, 1973

[54] APPARATUS FOR AUTOMATICALLY CHECKING PULSE-DISTORTION CORRECTION IN A SIGNAL CHANNEL

[75] Inventors: Fritz Eggimann, Oberengstringen; Gustav Guanella, Zurich, both of Switzerland

[73] Assignee: PAFELHOLD Patentverwertungs- & Electro- Holding AG, Glaurus, Switzerland

[22] Filed: Sept. 14, 1971

[21] Appl. No.: 180,427

[30] Foreign Application Priority Data

Sept. 25, 1970 Switzerland ........ 14243/70

[52] U.S. Cl. .......... 325/42, 178/69 R, 325/65, 333/18 R

[51] Int. Cl. .......... H03h 7/36

[58] Field of Search .......... 325/42, 65; 333/18 R; 178/88, 69 R, 22; 179/15 BP, 15 BY

[56] References Cited

UNITED STATES PATENTS

| | | | |
|---|---|---|---|
| 3,283,063 | 11/1966 | Kawashima et al. | 325/65 |
| 3,614,622 | 10/1971 | Holsinger | 325/65 |
| 3,461,239 | 8/1969 | Widl | 179/15 |
| 3,612,770 | 10/1971 | Zegers | 179/15 |
| 3,624,562 | 11/1971 | Fujimura | 333/18 |
| 3,445,771 | 5/1969 | Clapham et al. | 325/42 |
| 3,508,153 | 4/1970 | Gerrish et al. | 333/18 |
| 3,614,623 | 10/1971 | McAuliffe | 325/42 |
| 3,515,805 | 6/1970 | Fracassi et al. | 178/22 |
| 3,136,861 | 6/1964 | Mayo | 179/15 AF |

*Primary Examiner*—Benedict V. Safourek
*Attorney*—Greene & Durr

[57] ABSTRACT

A distortion correction scheme and apparatus in which communication signals are transmitted in the form of discrete pulses separated from one another by individual constant amplitude pulses of short time interval and irregularly changing sign. A transversal filter under control of a correlator corrects for the distortion present. The reference signal which is employed to adjust the regulating voltages developed by the correlator to control the product forming circuits of the transversal filter, is interrupted during the occurrence of each communication pulse whereby any adjustment necessary in the correction of distortion is performed continuously throughout transmission and only during those intervals in which communication signals are absent. Means are disclosed for generating the inserted signals in a quasi-statistical manner and for synchronizing operation at both the transmitting and receiving ends of the channel.

33 Claims, 12 Drawing Figures

INVENTORS
FRITZ EGGIMANN
GUSTAV GUANELLA
BY
Brenne & Durr

INVENTORS
FRITZ EGGIMANN
GUSTAV GUANELLA
BY
Greene & Durr

INVENTORS
FRITZ EGGIMANN
GUSTAV GUANELLA
BY
Ernest & Dunn

INVENTORS
FRITZ EGGIMANN
GUSTAV GUANELLA,

BY

INVENTORS
FRITZ EGGIMANN
GUSTAV GUANELLA
BY Greene & Durr

INVENTORS
FRITZ EGGIMANN
GUSTAV GUANELLA
BY
Glasscock & Durr

INVENTORS
FRITZ EGGIMANN
GUSTAV GUANELLA
BY
Greene & Durr

APPARATUS FOR AUTOMATICALLY CHECKING PULSE-DISTORTION CORRECTION IN A SIGNAL CHANNEL

The invention relates to apparatus for automatically controlling pulse-distortion correction in signal channels.

BACKGROUND OF THE INVENTION

The transmission of pulses over telephone lines or similar signal channels involves linear distortion which leads to undesired broadening, and to corresponding crosstalk if the pulse-interval is short. The distortion may be corrected by transversal filters, i.e., multi-stage delay systems with adjustable coupling values for the input and output points provided in the individual delay stages. It is possible for the coupling values to be automatically controlled by means of regulating voltages obtained by correlation methods from the distortion-corrected signals at the receiving end and from definite reference signals. The reference signals must agree with the corresponding transmitted signals during equalisation. This may be done by transmitting a pulse-train of which the nature is already known at the receiving location until equalisation is complete. Nevertheless, changes in the transmission channel which are often unavoidable make it necessary for equilisation to be repeated at appropriate intervals, known pulse-trains being again transmitted. The corresponding interruptions in information-transmission as such are undesired in operation. If the transmitted pulses are quantified in a predetermined amplitude-graduation, a known proposal enables the original signal to be recovered from a still incompletely distortion-corrected signal by automatic selection of the nearest stage of quantification, which original signal then also serves as the reference signal (cf. German Pat. No. 945,037). However, if the pulses are badly or variably distorted, this process can be used only after a certain amount of pre-equalisation has been attained, and with not excessively fine amplitude-quantification. It fails in the case of amplitude modulation without limitation to a predetermined graduation of quantification.

BRIEF DESCRIPTION OF THE INVENTION

According to the present invention there is provided apparatus for automatically checking pulse-distortion correction in a signal channel, including means for inserting in the communication signal at the transmitting end invididual pulses of constant amplitude and irregularly changing sign, there being at least two communication pulses between every two inserted individual pulses, means for obtaining a reference signal at the receiving end by evaluating the inserted pulses, means for interrupting the reference signal during the communication pulses and for switching it on during the inserted pulses, means for generating regulating voltages by means of a correlation circuit, the first input quantity of which is derived from the received signal of which the distortion is to be corrected, and the second input quantity of which comprises the interrupted reference signal, and means for applying said regulating voltages to control the coupling values of a transversal filter in said channel.

In particular, the received signal from which distortion has been removed by the transversal filter may in many cases at least be used as the first input quantity and the interrupted reference signal itself as the second input quantity.

BRIEF DESCRIPTION OF THE FIGURES

Preferred features and advantages of the present invention will become apparent from the following description, taken in conjunction with the accompanying drawings, of which.

DETAILED DESCRIPTION OF THE FIGURES

Figure 1:
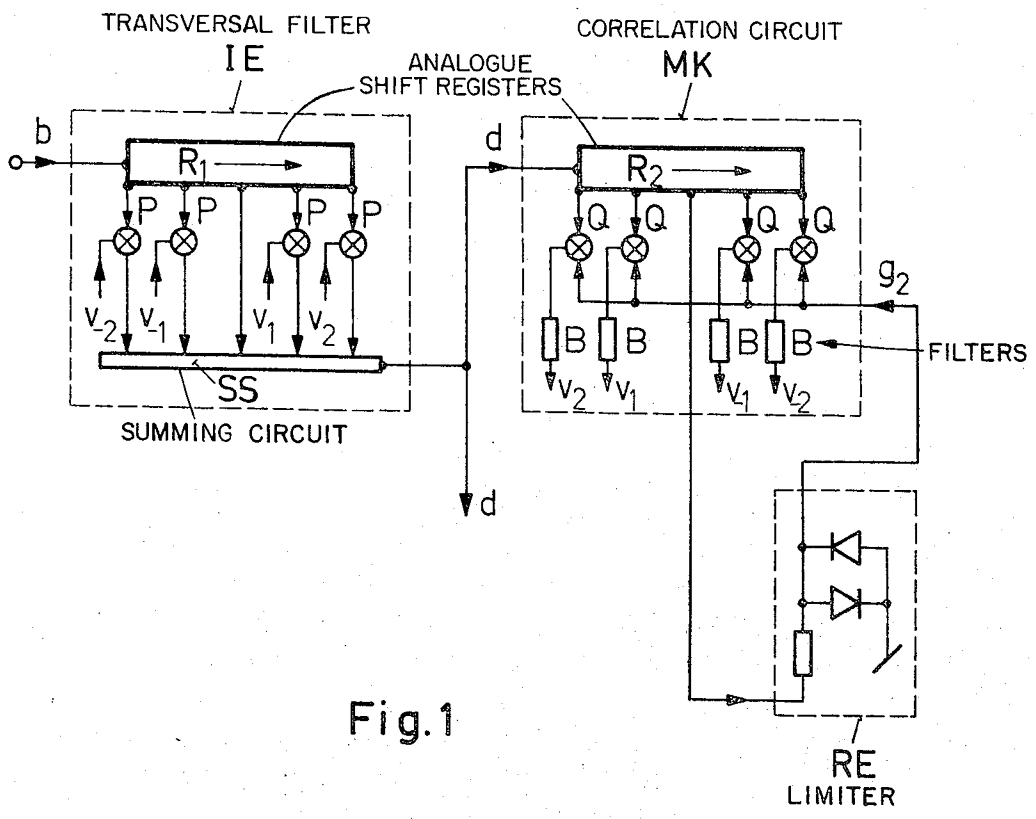
FIG. 1 is a schematic diagram illustrative of a known distortion correcting system.
Figure 3A:
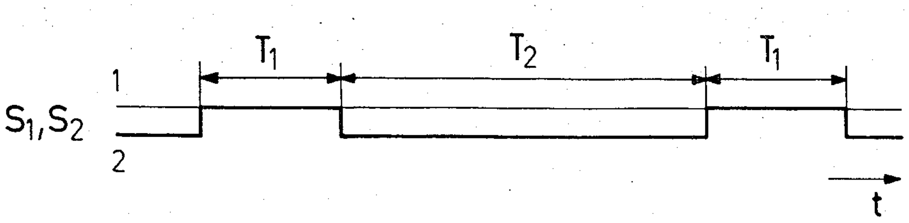
FIGS. 3*a* and 3*b* are timing diagrams illustrating the operation of the apparatus of FIG. 2.
Figure 3B:
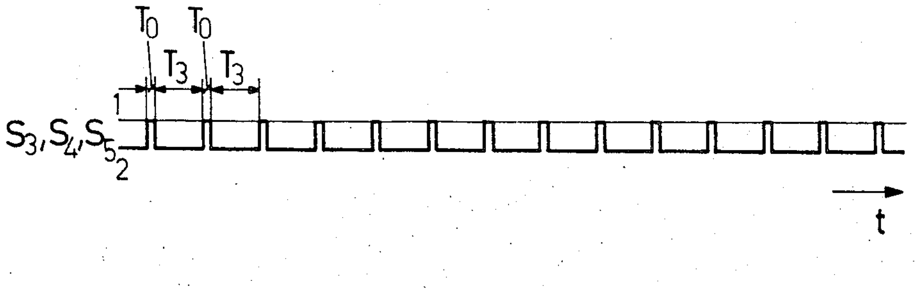

FIG. 1 first of all illustrates a known adaptive distortion-correcter with the transversal filter IE for pulse-distortion correction, a correlation circuit MK for checking the distortion correction and a device RE for obtaining the reference signal (cf. U.S. Pat. No. 3,543,160, FIG. 3, incorporated herein by reference thereto). The transversal filter consists of an analogue shift-register $R_1$ for delaying the input signal *b* of which the distortion is to be corrected, coupling members P for controlling the amplitude and sign of the delayed signals taken from the individual stages of the register in accordance with the regulating voltages $v_{-2}$—$v_2$ and a summing circuit SS having an output d for generating the distortion-corrected signal. The correlation circuit MK consists of an analogue shift-register $R_2$ and correlators Q for forming the products of the delayed signals taken from the individual register stages with a reference signal $g_2$. These products are smoothed in elements B by integration or low-pass filtering in order to form the regulating voltages $v_{-2}$—$v_2$. The reference signal is produced in RE by limiting the distortion-corrected received signal delayed in $R_2$.

Such a device is particularly suited to correcting distortion in constant-amplitude data signals. However, if the communication-pulse amplitude varies, difficulties are involved in obtaining reference signals by amplitude-limitation, especially in the "learning phase" before usable distortion-correction is attained.

Figure 2:
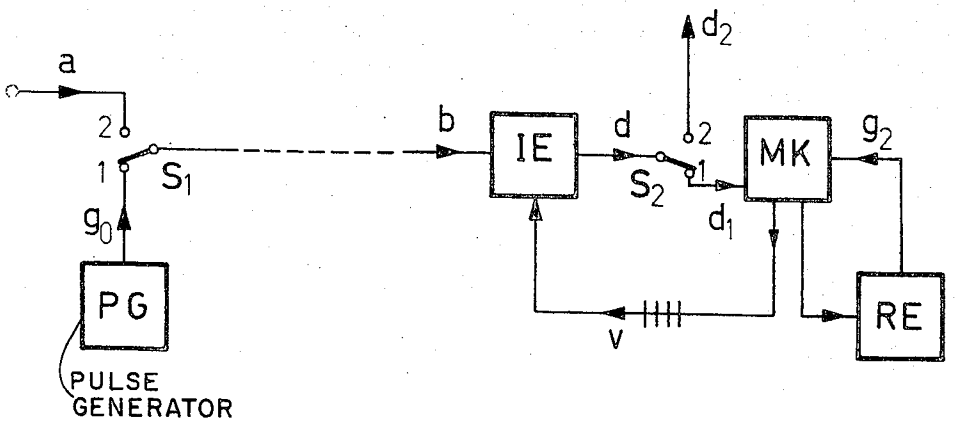
FIG. 2 is a schematic diagram illustrative of apparatus which may be used at the transmitting and receiving ends of a signal channel in carrying out the invention.

Some assistance may be procured by temporarily transmitting a constant-amplitude pulse-train until usable distortion-correction is attained. A suitable transmitting arrangement is shown in FIG. 2. During the "learning phase" the switch $S_1$ at the transmitting end is in position 1, so that instead of the amplitude-modulated communication pulses a the train of constant-amplitude auxiliary pulses $g_o$ generated in a pulse generator PG are transmitted. The switch $S_2$ at the receiving end is also in position 1 during the "learning" phase, so that the received signals $d_1$, not yet or only partly freed from distortion, pass first of all to the correlation circuit MK, the output voltages $v$ of which vary until optimum equalisation of the transversal filter IE is attained. After this equalisation has been attained, i.e., after the end of the "learning" phase, the regulating voltages are fixed; after the switches $S_1$, $S_2$ have each been changed over to position 2, the communication signals a can now be transmitted, and recovered at the receiving end as the distortion-corrected signals $d_2$. The reference signal $g_2$ is again produced, for example, by limiting in RE. The properties of the transmission channel usually vary in the course of time, so that a new learning phase, which may again last for a time $T_1$, must be switched on after a time $T_2$. The switches $S_1$, $S_2$ must thus be controlled substantially in accordance with the programme of FIG. 3*a*, the learning time $T_1$ embracing a plurality of pulse-steps each time. The transmission of communication pulses is limited in each case to the time $T_2$ between two learning phases.

Figure 4:
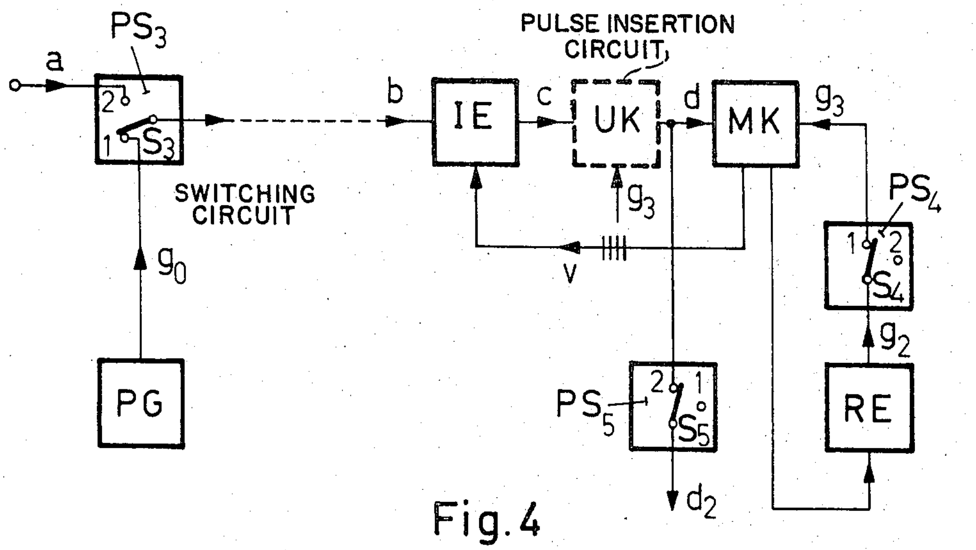
FIG. 4 is a schematic diagram illustrative of apparatus which may be used at the receiving end of a signal channel in carrying out the invention.

In order to avoid undesired interruption of the communication signal during a learning phase $T_1$ which embraces a plurality of steps, constant-amplitude individual pulses of irregularly changing sign are now inserted, in accordance with the invention, between each two groups of two or more communication pulses. Thus, the communication pulses are interrupted only for the duration $T_o$ of an individual pulse-step, while a group of two or more communication pulses is transmitted in the longer time-interval $T_3$ (relative to time-interval $T_o$) positioned between each two individual inserted pulses. Thus, if an arrangement according to FIG. 4 is used, the switch $S_3$ at the transmitting end in the switch unit $PS_3$ must be controlled in accordance with the programme of FIG. 3*b* in order to insert the unit pulses of appropriate time duration. The device at the receiving end (according to FIG. 4) is now provided with a switching unit $PS_5$ including the switch $S_5$ in order to separate the inserted pulses from the distortion-corrected output signal $d_2$. It can be shown that the correlator circuit operates satisfactorily, and thus satisfactory automatic equalisation of the transverse filter IE occurs, when the reference signal $g_2$ is interrupted during the constant time interval $T_3$ of the communication pulses, and is switched on only during the constant time occurrence $T_o$ of the inserted pulses (see FIG. 3*a*). For this purpose, a switching unit $PS_4$ including the switch $S_4$ is provided, the control programme for which may also be seen from FIG. 3b wherein the switches $S_3$ (transmitter end), $S_4$, $S_5$ (receiver end) are operated synchronously. This clock synchronization may be performed by known means.

Omission of communication pulses as a result of individual pulses being inserted may be avoided by slightly shortening the transmitted pulses, and transmitting the communication pulses which originally appeared in the time $T_o+T_3$ during a shortened time $T_3$. Such an insertion process is described, for example, in copending U.S. Pat. application Ser. No. 66,017 filed Aug. 21, 1971 now U.S. Pat. No. 3,697,875 issued Oct. 11, 1972 and which is incorporated herein by reference thereto.

Distortion of very low communication frequencies cannot be corrected by customary transversal filters with tolerable expenditure. In addition, low frequencies are often completely suppressed in the transmission channel. For this reason, an additional device, indicated by UK in FIG. 4, is required in some cases in order to correct or recover the low signal frequencies. Such devices are described in the above-mentioned U.S. Pat. No. 3,697,875. They make use of inserted pulse-gaps or inserted pulses of a definite amplitude, and accordingly can likewise be controlled with the reference pulses $g_3$ obtained in RE, as shown also in FIG. 1, and $PS_4$.

The constant-amplitude individual pulses may, for example, be obtained as pulses with constant amplitude and the same sign as a synchronously sampled noise voltage. They may, however, also belong to a separate data signal. However, in order to obtain the regulating voltage for the purpose of controlling the transversal filter, it is necessary for these pulses to exhibit a minimal auto-correlation, at least within all time-ranges which do not exceed the transit time of the shift-register in the transversal filter. Any auto-correlation between the pulses present in the transversal filter are depressed due to the effect of this filter; that is to say, the corrected signals would no longer correspond to the original signals. For the same reason, periodic repetitions of individual pulse-groups within this signal are also not permitted if the repetition period is not longer than the length of the said shift-register. If necessary, this condition may be complied with by additional conversion of the inserted pulses, for example, by a known masking or coding process.

Figure 5A:
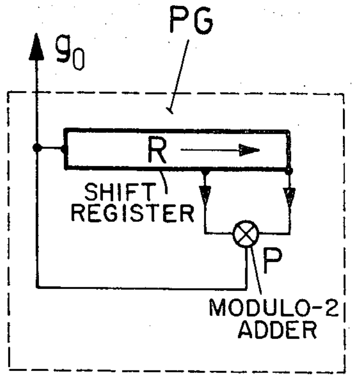
FIG. 5*a* is a schematic diagram of a pulse generator.

The inserted pulses may also be obtained with a back-coupled shift-register which is at least as long as the register in the transverse filter, and in which a correlation-free pulse-train circulates. However, even a shorter register is sufficient if logical circuits are provided in the reaction channel. FIG. 5*a* shows such an intrinsically known pulse-generator including a register R and a modulo-2 addition circuit P in the reaction channel. If the register-tapping points are appropriately chosen, the period of the generated pulse-train $g_o$ is considerably greater than the length of the register, and is substantially free from correlation within this range.

Figure 5B:
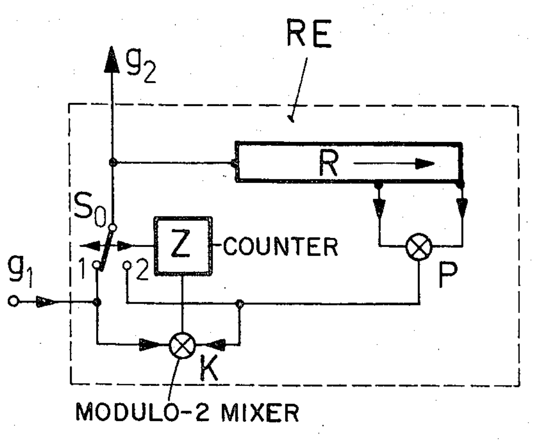
FIG. 5*b* is a schematic diagram of a modified form of pulse generator.

The reference pulses required at the receiving end may also be generated by a pulse-generator of the same kind as shown in FIG. 5a, which must then be synchronized with the generator at the transmitting end. This may be done, for example, with a circuit according to FIG. 5*b*, the individual pulses $g_1$ taken from the received signal being first of all fed to the shift-register R via the switch $S_0$ in position 1. If there are no errors in the pulse-train stored in register R, changing over the switch $S_0$ to position 2 causes the generator to operate in self-sustaining fashion. The generator then corresponds to the circuit according to FIG. 5*a*, so that agreement of the reference signal $g_2$ at the receiving end with the signal $g_0$ at the transmitting end continues to be ensured even if transmission is temporarily interfered with or interrupted. The pulse-train stored in register R (FIG. 5*b*) is free of errors as soon as the returned pulses obtained via P agree with the input pulses $g_1$ at least while a pulse is passing through the register, i.e., for the duration of at least $n$ steps ($n$ = number of stages in the register). This agreement is tested in the correlator (modulo-2 mixer) K, the output pulses of which actuate a counter Z in such a manner that $S_0$ is switched over to position 2 after an uninterrupted train of n positive pulses. A synchronizing system for such pulse-generators which is little affected by interference with transmission is described in U.S. Pat. No. 3,439,279 issued Apr. 4, 1969.

Figure 6:
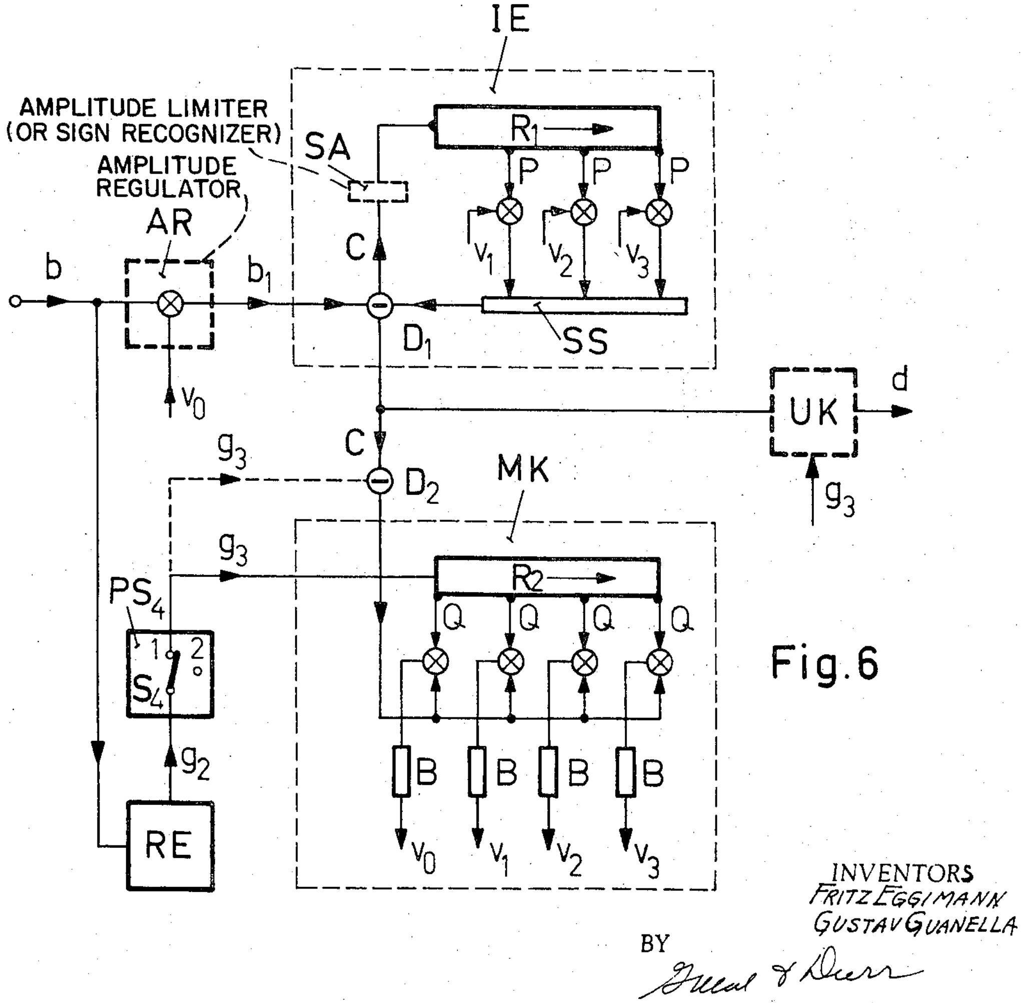
FIG. 6 is a schematic diagram illustrative of another form of apparatus which may be used at the receiving end of a signal channel.

The method of correcting for pulse-distortion shown in FIG. 1 may be used in conjunction with the invention by incorporating the transversal filter IE, the correlation circuit MK and the reference-signal generator RE in the device of FIG. 4. FIG. 6 shows a further embodiment of a distortion-correction device which it is advisable to use if the signals transmitted exhibit only delay distortion, i.e., if the pulse output of the transmission channel comprises, besides the original transmitted pulse, only lagging components of distortion, but no leading ones. In this case, the transversal filter IE may be constructed on the feedback principle, in which case the input signal $c$ of the register $R_1$, which already corresponds to the corrected signal, is obtained in a difference circuit $D_1$ from the distorted input signal $b$ and from the sum signal taken from SS. The manner of operation of such transversal filters, which are distinguished by a minimum number of stages in the shift-register $R_1$, is described, for example, in U.S. Pat. No. 3,537,007 issued Oct. 27, 1970. The same signal $c$ is fed either directly or via a further difference circuit $D_2$ to the correlation circuit MK, which is comprised of shift-register $R_2$ and a plurality of correlators with the polarity-reversers Q and the smoothing circuits B. The reference signal $g_2$ is obtained in RE (see also FIGS. 1 and 5b) by limiting the pulses inserted into the received signal or with a generator synchronized by these pulses. The reference signal is also interrupted here during the communication pulses by a switch S4 in the switch unit $PS_4$, and only fed in the form of an input signal $g_3$ to the correlation circuit MK during the presence of the inserted pulses. The same pulses $g_3$ may also be passed to a difference unit $D_2$, thus producing a second input signal for the correlation circuit in the form of an error signal ($c$-$g_3$). This error signal tends towards a minimum when the regulating voltage $v_0$ taken from MK is fed to an amplitude-regulator AR for the purpose of controlling the amplitude of the input signal $b_1$ fed to the transversal filter IE. A separate device UK, which is indicated in dashed line fashion, may again be provided in order to correct the recovery of the low communication frequencies. According to the construction of the correlation circuit, the latter must again be fed with the completely corrected signal $d$ instead of the corrected signal $c$ in accordance with FIG. 4.

If the communication pulses are not amplitude-modulated, an amplitude-limiter or a sign-recogniser SA may be provided in the transversal filter IE, so that the analogue register may be replaced by a simple digital register $R_1$. Such a solution is usable because in this case the distortion-corrected pulses are moreover again of constant amplitude.

The transversal filter IE shown in FIGS. 1 and 6 may be replaced by branching networks of the first or second canonic form, as described, for example, in "Archiv fur Elektrische Uebertragung" 1968, pp. 361–367.

Figure 7:
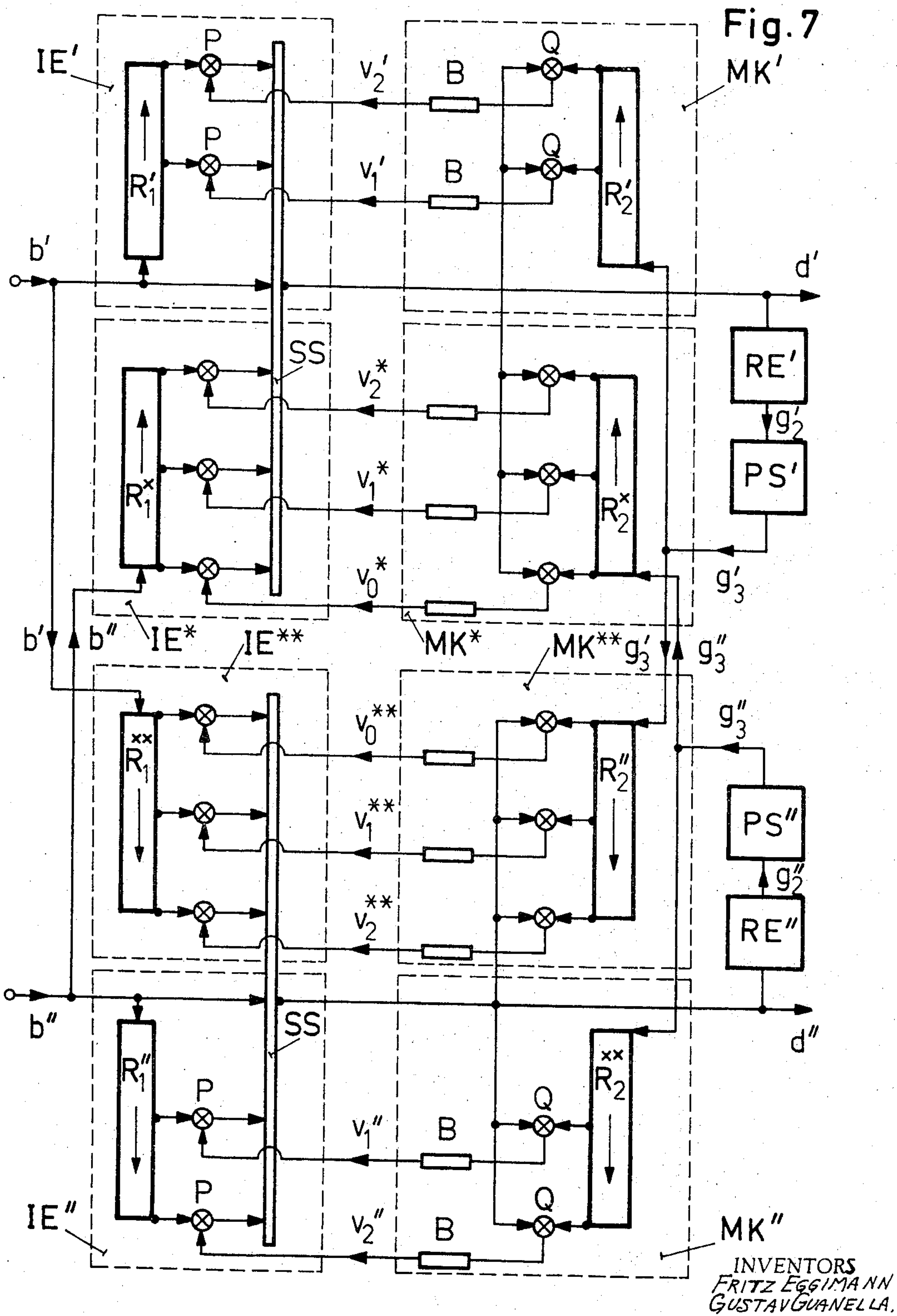
FIG. 7 is a schematic diagram illustrative of yet another form of apparatus which may be used at the receiving end of a signal channel.

FIG. 7 shows devices wherein not only linear distortion occurring within a definite transmission channel, but also additional interference caused by coupling between different channels, may be suppressed with adaptive distortion-correctors. A first transversal filter IE′ in conjunction with the correlation circuit MK′ corresponds to the distortion-correcting device with the corresponding circuits IE and MK in FIG. 6 and serves to suppress linear distortion of the received signal $b'$ at the end of a first transmission channel. Corresponding circuits IE′′ and MK′′ serve to correct for distortion of the received signal $b''$ in a second transmission channel. The transversal filter IE* whereof the coupling values are controlled by regulating voltages $v_0*$, $V_1*$, $v_2*$, from the correlation circuit MK* serves to supress crosstalk from the first channel on to the second channel. In a like manner, crosstalk from the second transmission channel on to the first transmission channel is suppressed in analogous fashion by the transverse filter IE in conjunction with the correlation circuit MK. The manner in which such devices act is explained in greater detail in Swiss Pat. NOs. 429,830 and 462,241. The reference pulses $g_3'$, which agree with individual pulses contained in the first de-distorted received signal $d'$, are generated by a limiter or a synchronzied pulse-generator in RE′ and the switch unit PS′, which interrupts the reference signal $g_2'$ during the occurrence of the channel signals. These reference pulses $g_3'$ control the correlation circuits MK′ and MK**. The reference pulses $g_3''$ are generated by pulse generator RE′′ and switch unit PS′′ to control the correlation circuits MK′′ and MK*. Pulses $g_3''$ are obtained in analogous fashion from the individual pulses of the corrected second received signal.

The individual pulses contained in the signals $b'$ and $b''$ and in the corresponding transmitted signals must not exhibit any cross-correlation, in order to enable linear pulse-distortion within the channels to be separated in the correlation circuits MK from distortion caused by crosstalk in the correlation circuits MK. These individual pulses must thus be generated at the transmitting end by separate pulse-generators not running in phase, or if a common pulse-generator is used, there must be an additional shift-register of sufficient length through which one pulse-train must be delayed with respect to the other by a time $T_4$, which in all cases is greater than the transit time of the shift-registers in the correlation circuits MK.

Figure 8:
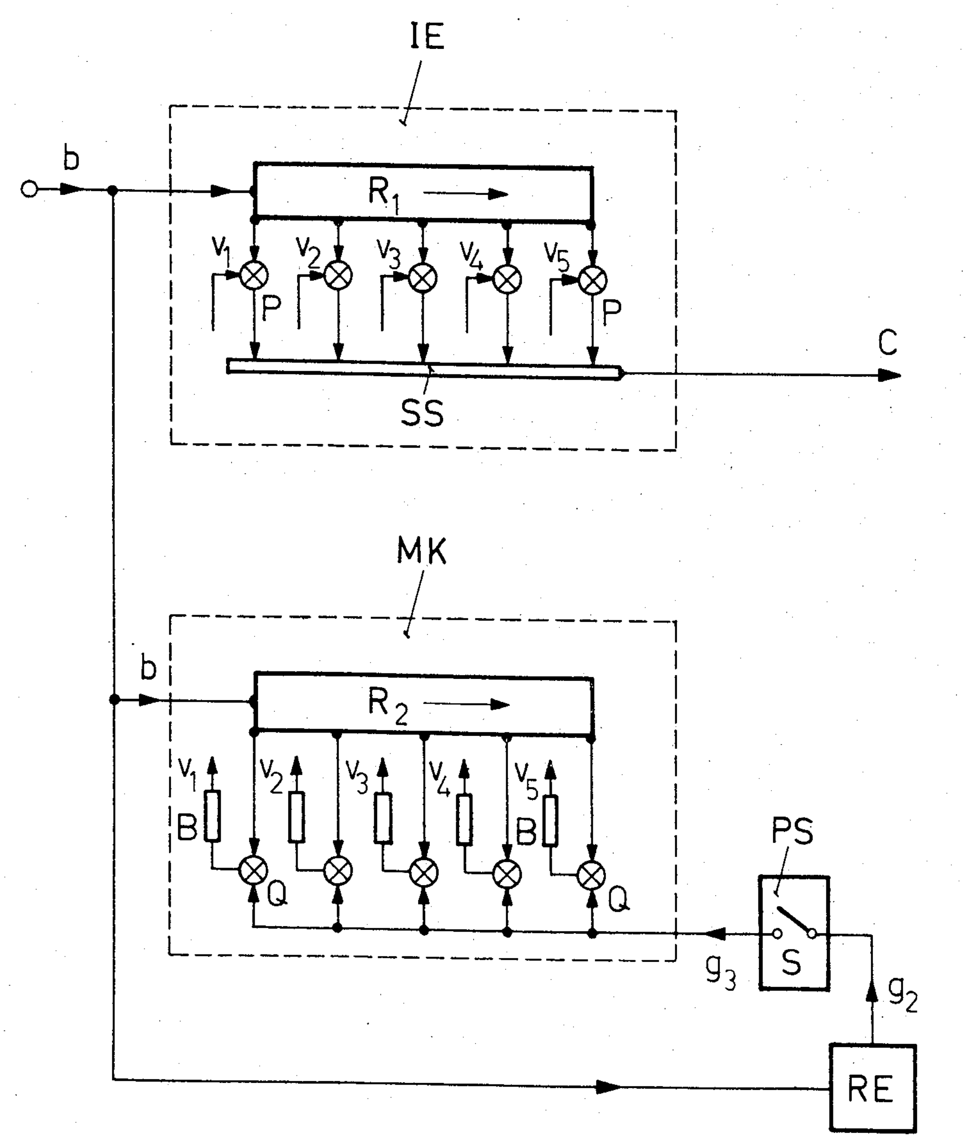
FIG. 8 is a schematic diagram illustrating a further embodiment of apparatus which may be used at the receiving end of a signal channel.

FIG. 8 shows the use of the device according to the invention with a transversal filter IE whereof the coupling values are controlled by the regulating voltages $v_1$—$v_5$ of the correlation circuit MK in such a manner that a distorted pulse of the received signal $b$ gives rise to an answering pulse of the output signal $c$ which agrees with the progression of the autocorrelation function of the distorted pulse. Since this autocorrelation function is symmetrical, and generally comprises a strongly dominant middle pulse, it already corresponds to a large extent to the original pulse. Of special significance is the circumstance that the middle pulse of the pulse-output thus obtained exhibits a constant timing with respect to the reference pulses $g_3$, independently of small changes in the timing phase of those reference pulses with respect to the received signal $b$.

This device may be automatically equalised during the transmission of communications with inserted individual pulses, a reference signal $g_2$ being again obtained in RE, interrupted during the communication pulses, and fed via the switch unit PS to the correlation circuit MK only during the inserted individual pulses. In this connection, generation of the regulating voltages $v_1$—$v_5$ is not affected by the progression of the communication signals. Since the shift-registers $R_1$, $R_2$ exhibit identical input signals, they may be replaced by a single register in a manner analogous to FIG. 10, from which register are taken both the derived voltages of the transverse filter and those of the correlation circuit.

Figure 9:
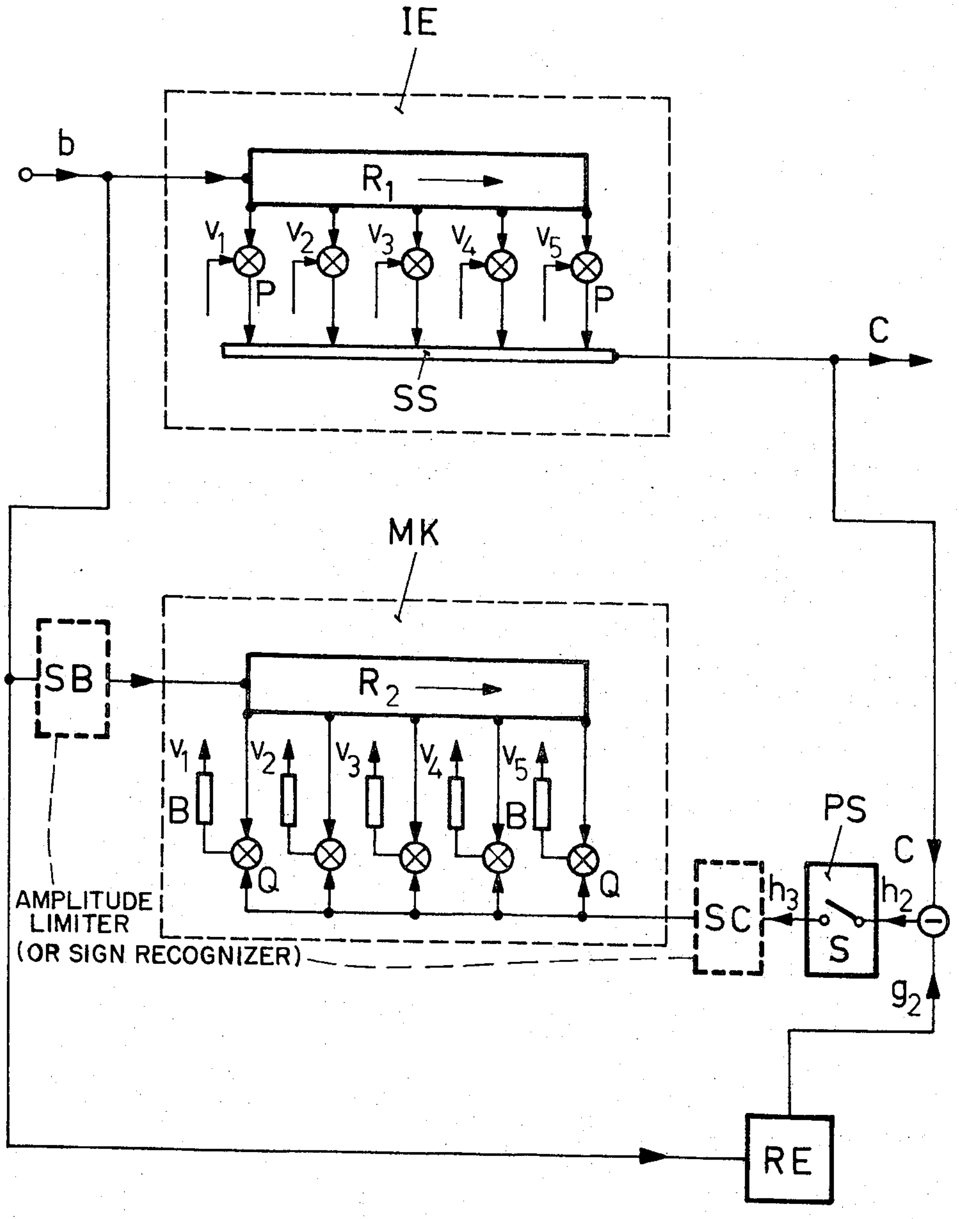
FIG. 9 is a schematic diagram illustrating a different form of apparatus which may be used at the receiving end of a signal channel.

FIG. 9 illustrates a similar device which is constructed for the purpose of correcting pulse distortion in accordance with the MSE (Mean Square-Error) method. The manner in which such distortion-correcting systems act may be seen, for example, from the "Bell System Technical Journal" 1969, pp. 55–70. An essential advantage resides in that the mean square error of the corrected received signal reaches a minimum after automatic equalisation has taken place. In operation, an input signal of the correlation circuit again consists of the distorted input signal $b$. In addition, a further input signal is obtained in the switch unit PS by forming the difference $h_2$ between the reference signal $g_2$ obtained in RE and the corrected signal $c$, and subsequently interrupting this error signal $h_2$ during occurrence of the communication pulses. It has been shown by simulation and by practical experiments that here also the same regulating voltages $v_1$—$v_5$ and thus also the same correction for pulse-distortion are attained as if the whole transmitted pulse-train were available as the reference signal at the receiving end.

According to known proposals, these devices may be provided with limiters or sign-recognisers SB or SC which will convert one or the other input signal of the correlation circuit MK, or even both input signals thereof, into a train of constant-amplitude pulses. This enables the analogue register $R_2$ to be replaced by a corresponding digital register.

Figure 10:
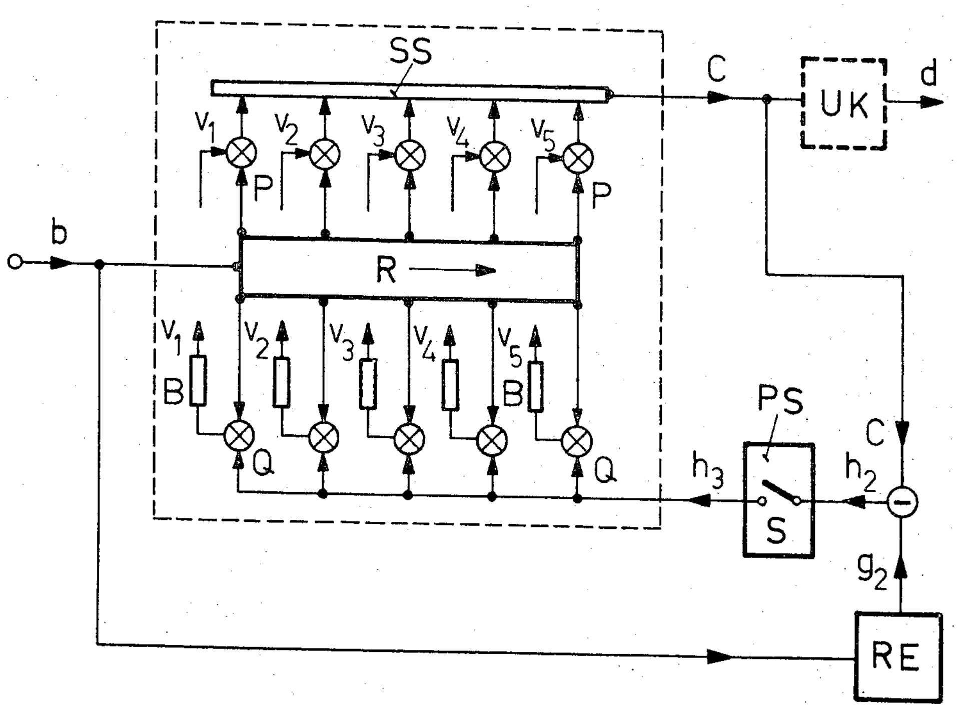
FIG. 10 illustrates a modified form of apparatus which may be used at the receiving end of a signal channel.

If the input signal of the register $R_1$ agrees with that of the register $R_2$, these registers may be replaced by a common register R according to FIG. 10. If may be advisable to follow up with a device UK for correcting low signal frequencies if the transverse filter does not sufficiently remove distortion from these frequencies because the register R is of limited length or if these frequencies are suppressed in transmission.

In the circuit examples shown, the variable-amplitude pulses are processed as corresponding analogue signals, and accordingly corresponding analogue registers and analogue product circuits are also used. The various operations may also be carried out using intrinsically known measures if all or some of the analogue signals are replaced by correspondingly coded pulse-trains. The individual pulses of these signals may for example be delayed in parallel connection with a corresponding number of digital shift-registers or in series connection with a correspondingly lengthened digital shift-register. Addition and multiplication are also easily possible in accordance with the rules of the digital computing art. In appropriate cases, minimum total expenditure is attained by the mixed use of analogue and digital processing.

The time required for automatic equalisation may be reduced if additional programme pulses are transmitted during a first phase of equalisation instead of the communication signal, said additional pulses being likewise obtained at the receiving end with a synchronised pulse-generator. During this first phase of equalisation, these additional pulses are also fed to the correlation circuit, so that a continuous train of reference pulses appears at the input of this circuit. After a usable degree of equalisation has been attained, or after the predetermined duration of the first phase of equalisation, the normal communication signals are then transmitted instead of these additional pulses.

Another measure for accelerating equalisation resides in that the number of correlators in the correlation circuit is first of all reduced during a first phase of equalisation, so that during this phase only those coupling values of the transverse filter which correspond to distortion of slight temporal displacement are regulated. The remaining correlators for controlling the remaining coupling values are then switched in one or more subsequent phase of equalisation. It has been shown that the time taken to attain satisfactory final equalisation can be considerably reduced in this way.

It is further possible to employ at least a part of the inserted individual pulses as a master pulse sequence for obtaining crypto signals (crypto texts) in scrambled (enciphered, encrypted) communication transmission.

In other words: at least some of the inserted individual pulses serve as a (irregular) master pulse sequence; by suitable means (e.g., an electronic computer) this sequence is converted to another pulse sequence (not recognizable for unauthorized persons) and the latter sequence is immediately used for enciphering (scrambling, encrypting) informations to be transmitted over a channel. This is obtained by mixing (superposing) the original informations (clear text) with the crypto text at the transmitting end, transmitting the enciphered informations over the channel and deciphering the received signal at the receiving end by mixing (superposing) it once more with the crypto text in order to retrieve the original information.

Although there has been described a preferred embodiment of this novel invention, many variations and modifications will now be apparent to those skilled in the art. Therefore, this invention is to be limited, not by the specific disclosure herein, but only the appending claims.

What is claimed is:

1. Apparatus for automatically checking pulse-distortion correction in a signal channel, including means for inserting in the communication signal at the transmitting end individual pulses of constant amplitude and irregularly changing sign to form a composite signal, there being at least two communication pulses between every two inserted individual pulses, input means for receiving the composite signal at the receiving end;

a transversal filter coupled to said receiving means and including first register means having plural outputs and means for forming products of time separated portions of the signal derived from said plural output with associated reference signals having regulated voltage values and means for summing said products to develop a corrected signal;

a correlation circuit coupled to said summing circuit and having a plurality of outputs for generating said plurality of regulated voltage value signals;

means coupled between said input means and said correlation circuit for generating a reference signal to adjust the levels of said reference signals;

switch means connected between said reference signal generating means and said correlation circuit for coupling said reference signal to the correlation circuit only during those intervals when said individual pulses are present.

2. Apparatus in accordance with claim 1 wherein said correlation circuit comprises a second register with plural outputs; a plurality of product generators each coupled to one of said second register plural outputs and said reference signal generating means to produce the reference signals wherein time separated points of at least the received signal freed from distortion by the transversal filter means is used as the first input quantity of the correlation circuit, and the interrupted reference signal itself is used as the second input quantity.

3. Apparatus in accordance with claim 2 wherein the means for inserting individual pulses includes means for periodically changing the polarity of the individual pulses wherein the change in sign of the individual inserted pulses is arranged to be repeated in periodically recurring portions whereof the length is not less than the maximum transit time of the transversal filter register means.

4. Apparatus in accordance with claim 3 further comprising plural filter means each coupled between one of said correlation circuit outputs and said product generating means wherein the autocorrelation function of the inserted pulses is arranged to be small within all time-ranges which are not greater than the maximum transit time of the transversal filter.

5. Apparatus in accordance with claim 1 comprising a communications channel and wherein the means for inserting individual pulses comprises a noise generator means and second switch means for selectively coupling either the communication signal or the generator means to the communications channel; said first and second switch means operating in synchronism.

6. Apparatus in accordance with claim 1 comprising a communications channel and wherein the means for inserting the individual pulses includes means for generating signals which take the form of pulses of a separate data signal to be transmitted, and second switch means for selectively coupling either the communication signal or the generator means to the communications channel; said first and second switch means operating in synchronism.

7. Apparatus in accordance with claim 1 including a communications channel and wherein the means for inserting individual pulses includes generator means for generating a pulse-train comprised of a quasi-statistical pulse sequence, and second switch means for selectively coupling either the communication signal or the generator means to the communications channel; said first and second switch means operating in synchronism.

8. Apparatus in accordance with claim 7 wherein the means for inserting individual pulses comprises a shift register having plural outputs; summing means for summing selected ones of said outputs and coupling the generated sum to the input of the register, the individual pulses being taken from the output of said summing means.

9. Apparatus in accordance with claim 8 wherein said summing means is a modulo-2 adder.

10. Apparatus in accordance with claim 1 wherein the communication pulses are generated by means for generating communicating pulses of constant amplitude, said generating means including means for changing the sign of the communication pulses according to the information to be transmitted.

11. Apparatus in accordance with claim 1 further including means for quantifying the amplitude of the communication pulses in a predetermined gradation.

12. Apparatus in accordance with claim 1 wherein the communication pulses are generated by means which are amplitude-modulated in accordance with the information being transmitted.

13. Apparatus in accordance with claim 1 wherein said reference signal generating means comprises amplitude limiting means.

14. Apparatus in accordance with claim 1 wherein said reference signal generating means comprises pulse-generator means which is synchronized with said first switch means to generate the inserted individual pulses.

15. Apparatus in accordance with claim 14 wherein said first pulse generator means further comprising switch means for initially coupling the first pulse-generator means with said input means for accepting the received signal, means for comparing the received signal with the output of said first pulse generator means and for operating said switch means to decouple the input means from the input of said first pulse generator means and couple the output of said pulse generator means to its input, whereby said first pulse generator means is capable of self-sustaining operation after synchronism has been detected by said comparison means.

16. Apparatus in accordance with claim 15 wherein the switch-over to self-sustaining operation is controlled by counting means coupled to said comparison means whereby switch-over occurs as soon as agreement exists between inserted pulses in the received signal and the pulses in the return channel of the generator for a duration corresponding to at least the transit time of a signal through the pulse generator.

17. Apparatus in accordance with claim 14, further comprising second pulse generator means at said sending end for generating said individual pulses, said second pulse generator means being identical to said first pulse generator means.

18. Apparatus in accordance with claim 1 including correcting means coupled to said transversal filter summing means and said switching means wherein the reference pulses obtained by interrupting the reference signal during the communication pulses are generated by said correcting means and applied to said correlation means for correcting low signal frequencies of the corrected signal.

19. Apparatus in accordance with claim 1 wherein at least a part of the inserted individual pulses is used as a master pulse sequence for obtaining crypto signals in encrypted communication transmission.

20. Apparatus in accordance with claim 1 wherein the correlation circuit comprises a multi-stage shift-register to which the first input signal is fed, and a plurality of individual correlators each coupled to respective outputs of the shift-register and to said switch means whereof each forms the mean product of voltage derived from one shift-register output and a second input signal coupled to each of said correlators.

21. Apparatus in accordance with claim 20 further comprising a difference circuit coupled to summing means and said reference signal generating means wherein the first input signal of the correlation circuit consists of the difference between the de-distorted received signal and the reference signal, and the second input signal consists of the reference signal developed by the reference signal generating means interrupted by said switch means during the communication pulses.

22. Apparatus in accordance with claim 1 comprising means coupled to said correlation circuit for amplitude limiting at least one input signal applied to the correlation circuit.

23. Apparatus wherein compensation for linear distortion occurring within a first transmission channel is arranged to be supplemented by compensation for crosstalk interference caused by coupling between first and second pulse channels, comprising first and second apparatus each being of the type set forth in claim 1 for distortion correction of said first and second channels respectively and wherein the received signal of the second channel is fed to the transversal filter of said second apparatus, the regulating voltage for controlling the coupling values of the second apparatus transversal filter being obtained from the second apparatus correlation circuit, the input signals for which comprise the already de-distorted output signal and a reference signal obtained from the second apparatus switch means which provides the inserted individual pulses of the second channel, said reference signal being arranged to be interrupted during the communication pulses of the second channel and wherein the inserted pulses of the first channel from which distortion is to be removed and of the second channel exhibit no cross-correlation.

24. Apparatus in accordance with claim 1 including means for generating additional auxiliary pulses of constant amplitude are transmitted in place of the communication pulses in a first phase of equalisation and corresponding reference pulses are used at the receiving end.

25. Apparatus in accordance with claim 1 wherein said correlation means comprised a plurality of individual correlators wherein means are provided at the beginning of equalisation for reducing the number of correlators operating in the correlation circuit and thereby correspondingly reducing the number of coupling values in the transverse filter, and means for increasing the number of individually effective correlators and of corresponding coupling values in the course of equalisation.

26. Apparatus for automatically checking pulse-distortion correction in a signal channel, including means for inserting in the communication signal at the transmitting end individual pulses of constant amplitude and irregularly changing sign to form a composite signal, there being at least two communication pulses between every two inserted individual pulses, input means for receiving the composite signal at the receiving end, a transversal filter coupled to said receiving means and including first register means having plural outputs and means for forming products of time separate portions of the signal derived from said plural output with associated reference signals having regulated voltage values and means for summing said products to develop a corrected signal;

a correlation circuit coupled to said input means and having a plurality of outputs for generating said plurality of regulated voltage value signals, means coupled between said input means and said correlation circuit for generating a reference signal to adjust the levels of said reference signals;

switch means connected between said reference signal generating means and said correlation circuit for coupling said reference signal to the correlation circuit only during those intervals when said individual pulses are present.

27. Apparatus in accordance with claim 26 comprising difference means coupled between the output of the transversal filter summing means and said interrupting means wherein the difference between the corrected received signal and the reference signal, which difference is interrupted during the communication pulses, serves at the second input quantity to said correlation means.

28. Apparatus in accordance with claim 26 wherein the correlation circuit includes means for directly employing the outputs of said first register means in producing said regulated voltage signals.

29. Apparatus for pulse distortion correction in a signal channel through which communication signals are transmitted comprising:

means at an input end for inserting a pulse of constant amplitude and irregularly changing sign between said communication signals at least two communication pulses are each separated from the other by one of said inserted pulses;

transversal filter means having a first input coupled to said channel for generating distortion corrected communication pulses;

correlation means coupled to the output of said transversal filter means and having a plurality of outputs;

means coupled to one output of said correlation means outputs for generating a reference signal;

said correlation means including a first plurality of product means each responsive to an associated one of said outputs and said reference signal for generating a regulating voltage;

said transversal filter means including means responsive to said regulating voltages and said incoming signal for forming a plurality of product signals and means for summing said product signals to obtain said distortion corrected communication signals;

means coupled between said reference signal generating means and said first plurality of product means responsive to said constant amplitude pulses for interrupting said reference signal only during the occurrence of said communication pulses.

30. The apparatus of claim 29 wherein said reference signal generating means comprises multi-stage shifting means having a plurality of outputs;

means coupled to at least two selected ones of said outputs for forming a sum;

switch means having a first position for coupling said communications channel to the input of said shifting means and a second position for decoupling said channel from said shifting means and coupling the output of said summing means to the input of said shifting means for self-sustained operation thereof;

comparison means coupled to said summing means and said channel for operating said switch means to said second position only when said signals compare.

31. The apparatus of claim 30 wherein said comparison means further includes counting means for controlling operation of said switch means to said second position only after a predetermined number of pulses of said shifting means and said channel are in synchronism.

32. A distortion correction circuit for correcting distortion of communication signals transmitted through a channel and together with constant amplitude alternating polarity reference pulses each being interspersed between two communication pulses comprising:

a transversal filter including:

a multi-stage shif means having a plurality of outputs;

a plurality of product forming means having a first input coupled to an associated output of said shift means;

a second input and a single output for each product forming means and summing means for summing the outputs of said product forming means;

a correlation circuit comprising:

second multi-stage shift means having a plurality of outputs;

a second plurality of product forming means each having a first input coupled to an associated one of said shift means outputs, a second input and a single output for each product forming means; and means for generating a reference signal from said channel;

the input of said second shift means being coupled to the output of said summing means;

the second inputs of said first product forming means being coupled to associated outputs of said second product forming means;

means coupled between the second inputs of each of said product forming means and said reference signal generating means for interrupting said reference signal only during each communication pulse.

33. The apparatus of claim 32 wherein said reference signal generating means comprises a pulse generator and switch means for selectively coupling said pulse generator to said channel or to itself for self-excitation;

means for operating said switch means to place said pulse generator in the self-exciting state when the signals in said channel and the output of said pulse generator are in synchronism.

* * * * *

UNITED STATES PATENT OFFICE
CERTIFICATE OF CORRECTION

Patent No. 3,775,685 Dated November 27, 1973

Inventor(s) Fritz Eggimann and Gustav Guanella

It is certified that error appears in the above-identified patent and that said Letters Patent are hereby corrected as shown below:

On the title page, left column, after "(13) Assignee", the first word in assignee should be --- PATELHOLD --- instead of "PAFELHOLD".

On the title page, right column, in the "Abstract", line 1, --- is disclosed --- should be added after "apparatus".

Column 2, line 51 "$\nu_{-2} - \nu_2$"should be --- $v_{-2}, \ldots . v_2$ ---.

Column 2, line 59, "$\nu_{-2} - \nu_2$" should be --- $v_{-2}, \ldots . v_2$---.

Column 3, line 13, "$\nu$ " should be --- v ---.

Column 6, line 14, "$\nu_o$*, $V_1$*, $\nu_2$*" should be --- $v_o$*, $v_1$*, $v_2$* ---.

Column 6, line 22, "NOs." should be --- Nos. ---.

Column 6, line 53, "$v_1 - v_5$" should be --- $v_1, \ldots . v_5$ ---.

Column 7, line 5, "$\nu_1 - \nu_5$" should be --- $v1, \ldots . v_5$ ---.

Column 7, line 28 "$\nu_1 - V_5$" should be --- $v_1, \ldots . v_5$ ---.

Column 7, line 41, "If" shoud be --- It ---.

Claim 15, line 2, "comprising" should be --- comprises ---.

Claim 32, line 8, "shif" should be --- shift ---.

Signed and sealed this 30th day of July 1974.

(SEAL)
Attest:

McCOY M. GIBSON, JR.
Attesting Officer

C. MARSHALL DANN
Commissioner of Patents

M PO-1050 (10-69)

USCOMM-DC 60376-P69
☆ U.S. GOVERNMENT PRINTING OFFICE : 1969 O—366-334